(12) United States Patent
Wang et al.

(10) Patent No.: US 11,520,192 B2
(45) Date of Patent: Dec. 6, 2022

(54) ARRAY SUBSTRATE AND DISPLAY APPARATUS

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Xiaoyuan Wang, Beijing (CN); Wu Wang, Beijing (CN); Yan Fang, Beijing (CN); Yajie Bai, Beijing (CN); Ruilin Bi, Beijing (CN)

(73) Assignees: CHONGQING BOE OPTOELECTRONICS TECHNOLOGY CO., LTD., Chongqing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 278 days.

(21) Appl. No.: 16/618,869

(22) PCT Filed: Mar. 25, 2019

(86) PCT No.: PCT/CN2019/079462
§ 371 (c)(1),
(2) Date: Dec. 3, 2019

(87) PCT Pub. No.: WO2020/082685
PCT Pub. Date: Apr. 30, 2020

(65) Prior Publication Data
US 2022/0004063 A1    Jan. 6, 2022

(30) Foreign Application Priority Data

Oct. 25, 2018 (CN) .......................... 201811248804.8

(51) Int. Cl.
*G02F 1/1343* (2006.01)
*G02F 1/1362* (2006.01)

(52) U.S. Cl.
CPC .. *G02F 1/134345* (2021.01); *G02F 1/134372* (2021.01); *G02F 1/136209* (2013.01); *G02F 1/136286* (2013.01); *G02F 2201/40* (2013.01)

(58) Field of Classification Search
CPC ........... G02F 1/134372; G02F 2201/40; G02F 1/136286; G02F 1/134345; G02F 1/136209; G02F 1/133707; G02F 1/134309
See application file for complete search history.

(56) References Cited

U.S. PATENT DOCUMENTS 7,880,857 B2   2/2011   Tsubata et al.
10,401,685 B2  9/2019   Liu
(Continued)

FOREIGN PATENT DOCUMENTS

CN    101038408 A    9/2007
CN    202330961 U    7/2012
(Continued)

OTHER PUBLICATIONS

International Search Report dated Sep. 20, 2019, issued in counterpart application No. PCT/CN2019/079462. (11 pages).
(Continued)

*Primary Examiner* — Jia X Pan
(74) *Attorney, Agent, or Firm* — WHDA, LLP

(57) ABSTRACT

The present disclosure relates to an array substrate. The array substrate may include a base substrate; a first electrode layer on the base substrate, and at least one connection electrode at a periphery of the first electrode unit. The first electrode layer may include a plurality of first electrodes, each of the plurality of first electrodes may include at least
(Continued)

one first electrode unit, the first electrode unit may include a plurality of strip electrodes, and a plurality of slits are between the plurality of strip electrodes. The plurality of strip electrodes are electrically connected to the connection electrode, and the connection electrode disconnects at one or more positions such that corresponding ends of one or more of the plurality of slits form openings at the one or more positions of the connection electrode.

14 Claims, 18 Drawing Sheets

(56) References Cited

U.S. PATENT DOCUMENTS

| | | | |
|---|---|---|---|
| 2007/0236637 A1 | 10/2007 | Hsieh et al. | |
| 2007/0279567 A1* | 12/2007 | Matsushima | G02F 1/134363 349/143 |
| 2009/0009671 A1 | 1/2009 | Wakabayashi | |
| 2009/0015774 A1* | 1/2009 | Asakura | G02F 1/134363 349/141 |
| 2009/0128727 A1* | 5/2009 | Yata | G02F 1/134363 349/46 |
| 2013/0077008 A1* | 3/2013 | Kim | G02F 1/136227 349/42 |
| 2014/0092353 A1* | 4/2014 | Matsushima | G02F 1/13439 349/110 |
| 2014/0240629 A1 | 8/2014 | Zhou et al. | |
| 2015/0108486 A1* | 4/2015 | Um | G02F 1/136286 257/72 |
| 2015/0129877 A1* | 5/2015 | Cho | G02F 1/134309 257/59 |
| 2015/0236042 A1* | 8/2015 | Peng | G02F 1/134363 257/72 |
| 2016/0291436 A1* | 10/2016 | Zhang | G02F 1/136286 |
| 2017/0108745 A1* | 4/2017 | Jia | G02F 1/136286 |
| 2017/0277008 A1 | 9/2017 | Jiang et al. | |
| 2018/0068626 A1* | 3/2018 | Zhao | G09G 3/3655 |
| 2018/0210292 A1 | 7/2018 | Liu | |

FOREIGN PATENT DOCUMENTS

| | | | |
|---|---|---|---|
| CN | 103941485 A | | 7/2014 |
| CN | 203773203 U | | 8/2014 |
| CN | 105676550 A | * 6/2016 | G02F 1/134363 |
| CN | 105676550 A | | 6/2016 |
| CN | 107167973 A | | 9/2017 |
| CN | 109239994 A | | 1/2019 |
| EP | 2717093 A1 | | 4/2014 |
| JP | 2007-133280 A | | 5/2007 |
| JP | 2008-083209 A | | 4/2008 |
| KR | 100827459 B1 | | 5/2008 |

OTHER PUBLICATIONS

Office Action dated May 27, 2020, issued in counterpart CN application No. 201811248804.8, with English translation. (27 pages).

Office Action dated Jun. 22, 2022, issued in counterpart EP Application No. 19853278.0, with Extended European Search Report dated Jun. 2, 2022. (9 pages).

* cited by examiner

Related Art

Related Art

Related Art

Related Art

ARRAY SUBSTRATE AND DISPLAY APPARATUS

CROSS-REFERENCE TO RELATED APPLICATIONS

This application claims benefit of the filing date of Chinese Patent Application No. 201811248804.8 filed on Oct. 25, 2018, the disclosure of which is hereby incorporated in its entirety by reference.

TECHNICAL FIELD

The present disclosure relates to display technologies, and in particular, to an array substrate and a display apparatus.

BACKGROUND

Liquid crystal display (LCD) relies on a backlight module disposed at the back of the liquid crystal display panel to provide light required for display. Thus, the transmittance of the display panel is an important performance index. With the development of display technology, the transmittance requirement for liquid crystal display panel is getting higher and higher.

At the same time, in order to ensure good display quality of the liquid crystal display panel, it is necessary to control defects such as black gap and bright spots (such as Blue Spot) within a reasonable range. Among them, the reason for formation of black gap is that the support density of the spacers in the liquid crystal display panel is insufficient, and the pressure resistance of the liquid crystal display panel is weak. Thus, under action of external force, the spacers cannot recover in a sufficiently short period of time, thereby resulting in appearance of black gap. Furthermore, the reason for formation of bright spots is that the spacers scratch the alignment film layer under the action of external force, thereby resulting in abnormal alignment of the liquid crystal molecules. Accordingly, bright spots appear.

In order to reduce the display defects caused by dark spots and bright spots, the current effective method is to increase the support density of the spacers by increasing the size and number of the spacers while widening the black matrix (BM) at the positions of the spacers to shield the spacers. However, increasing the width of the black matrix will undoubtedly decrease the sub-pixel aperture ratio, thereby resulting in a decrease in the transmittance of the liquid crystal display panel.

In the related art, a highly transparent material such as a highly transparent polarizer, a highly transparent liquid crystal, or a high transparency film is usually used to improve the transmittance of the liquid crystal display panel. However, the use of the above highly transparent material not only increases the cost, but also the improvement of the transmittance of the liquid crystal display panel is very limited. Especially for high-resolution liquid crystal display devices such as 8K (ie 7680×4320 resolution) and 10K (10240×4320 resolution), the size of a single sub-pixel is extremely small. Even with highly transparent materials, it is difficult to achieve significant improvement in transmittance.

BRIEF SUMMARY

An embodiment of the present disclosure provides an array substrate. The array substrate may include a base substrate; a first electrode layer on the base substrate, and at least one connection electrode at a periphery of the first electrode unit. The first electrode layer may include a plurality of first electrodes, each of the plurality of first electrodes may include at least one first electrode unit, the first electrode unit may include a plurality of strip electrodes, and a plurality of slits are between the plurality of strip electrodes. The plurality of strip electrodes are electrically connected to the connection electrode, and the connection electrode disconnects at one or more positions such that corresponding ends of one or more of the plurality of slits form openings at the one or more positions of the connection electrode.

Optionally, among the plurality of first electrodes of each row, two first electrode units at corresponding positions of two adjacent first electrodes respectively are connected, and there is no gap between the two adjacent first electrodes.

Optionally, the connection electrode of each of the two adjacent first electrode units comprises a first sub-connection electrode between the two adjacent first electrode units, the plurality of strip electrodes in each of the two adjacent first electrode units is connected to the respective first sub-connection electrode, and first sub-connection electrodes of the two adjacent first electrode units form a unitary structure.

Optionally, the first electrode layer is functioned as a common electrode.

Optionally, ends of the plurality of slits opposite from the first sub-connection electrode in the two adjacent first electrode units are all open.

Optionally, ends of the plurality of slits opposite from the first sub-connection electrode in the two adjacent first electrode units are alternatively open and closed.

Optionally, a width of the first sub-connection electrode is in a range of about 2 µm to about 3 µm.

Optionally, the array substrate further comprises a black matrix on a side of the first electrode layer facing or opposite from the base substrate, and orthographic projection of the first sub-connection electrode on the base substrate is within orthographic projection of the black matrix on the base substrate.

Optionally, the connection electrode of the first electrode unit further comprises a second sub-connection electrode, and the second sub-connection electrode and the first sub-connection electrode are respectively disposed at opposite sides of the first electrode unit; the second sub-connecting electrode disconnects at one or more positions, and corresponding ends of the plurality of slits opposite from the first sub-connection electrode form a plurality of openings at the one or more positions of the second sub-connecting electrode.

Optionally, the plurality of slits are divided into at least two groups, ends of the plurality of slits opposite from the first sub-connection electrode within each of the at least two groups are uniformly open or closed, and the ends of the plurality of slits opposite from the first sub-connection electrode among different groups are alternately open and closed.

Optionally, each of the at least two groups includes 2, 3, or 4 adjacent slits.

Optionally, the plurality of strip electrodes of one of the two adjacent first electrode units are connected in one-to-one correspondence with the plurality of strip electrodes of the other of the two adjacent first electrode units, and the plurality of slits of one of the two adjacent first electrode units are connected in one-to-one correspondence with the plurality of slits of the other of the two adjacent first electrode units to form a plurality of connecting slits, and at least one end of each of the plurality of connecting slits is closed.

Optionally, in the two connected first electrode units, the connection electrode of each of the first electrode units comprises a third sub-connection electrode at a side of the first electrode unit opposite from the other one of the first electrode units, and the third sub-connection electrode disconnects at one or more positions, and corresponding ends of the plurality of connecting slits form openings at the one or more positions of the third sub-connection electrode.

Optionally, ends of the plurality of connecting slits on a same side of the first electrode unit are alternately opened and closed.

Optionally, the plurality of connecting slits are divided into at least two groups, each of the at least two groups comprises at least two adjacent connecting slits, ends of the plurality of connecting slits at a same side of the first electrode unit within each of the at least two groups are uniformly opened or closed, and the ends of the plurality of connecting slits at the same side of the first electrode unit among different groups are alternately opened and closed.

Optionally, the array substrate further comprises a second electrode layer on a side of the first electrode layer facing or opposite from the base substrate, and the second electrode layer is configured to transmit a pixel voltage signal, the second electrode layer comprises a plurality of second electrodes, and the plurality of second electrodes are in one to one correspondence with the plurality of sub-pixels.

Optionally, each of the plurality of slits has a width in a range of about 2 μm to about 3 μm.

Optionally, the array substrate further comprises: a plurality of sub-pixels arranged in an array and a plurality of gate lines, and the plurality of sub-pixels of each row alternately electrically connects to two of the gate lines; and the plurality of first electrodes are in one to one correspondence with the plurality of sub-pixels.

Optionally, extending direction of the plurality of the strip electrodes is substantially parallel to the gate lines, and extending direction of the plurality of slits coincides with the extending direction of the plurality of strip electrodes.

One example of the present disclosure is a display apparatus, comprising the array substrate according to one embodiment of the present disclosure.

BRIEF DESCRIPTION OF THE DRAWINGS

The subject matter which is regarded as the disclosure is particularly pointed out and distinctly claimed in the claims at the conclusion of the specification. The foregoing and other objects, features, and advantages of the present disclosure are apparent from the following detailed description taken in conjunction with the accompanying drawings in which:

FIG. 1c is a plan view of the first electrode of FIG. 1a;

DETAILED DESCRIPTION

Figure 1A:
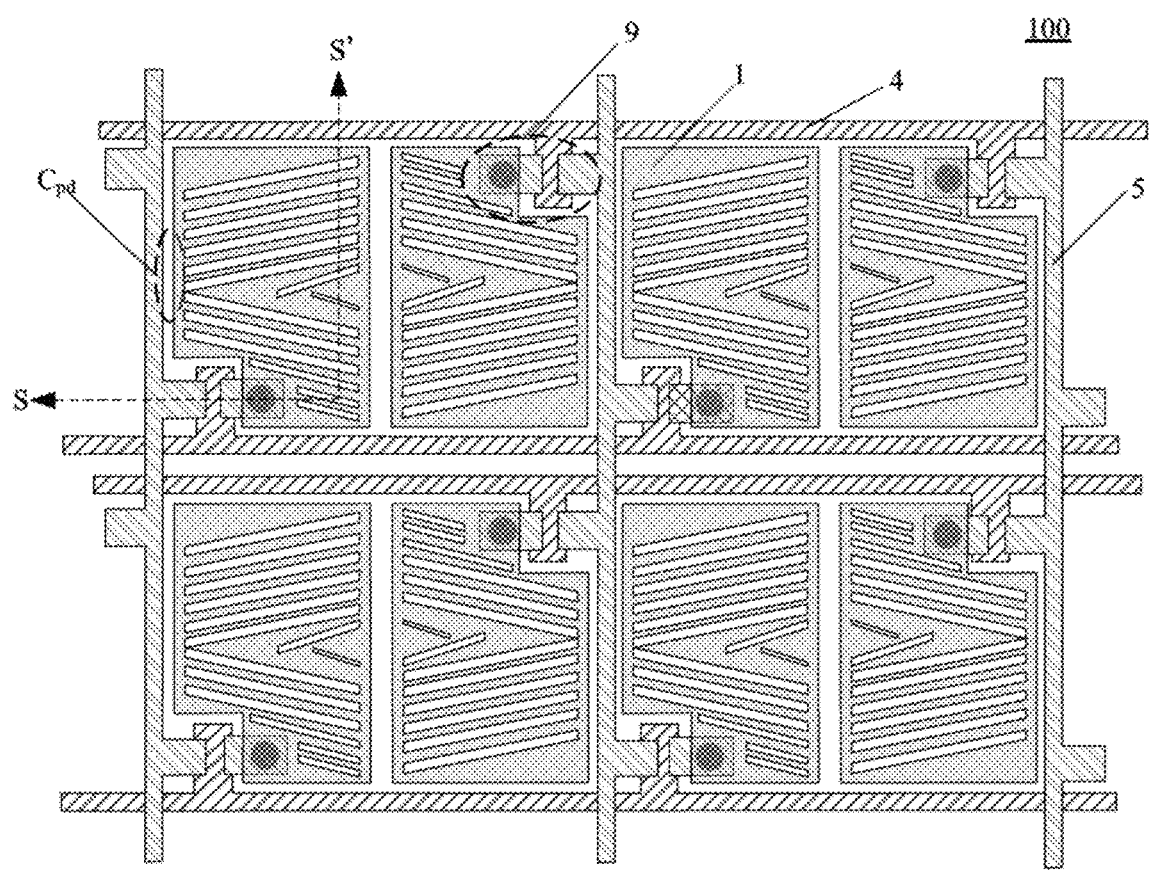
FIG. 1a is a top plan view of an array substrate of a dual-gate pixel structure.

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-11b. When referring to the figures, like structures and elements shown throughout are indicated with like reference numerals.

Unless otherwise defined, technical terms or scientific terms used in the present disclosure are intended to be in the ordinary meaning of those of ordinary skill in the art. The words "first," "second" and similar words used in the present disclosure do not denote any order, quantity or importance, but are merely used to distinguish different components. The words "including" or "comprising" and the like mean that the element or the item preceding the word includes the element or item listed after the word and its equivalent and do not exclude other components or objects. "Connected" and the like are not limited to physical or mechanical connections, but may include electrical connections, whether direct or indirect. "Upper," "lower," "left," "right," etc. are only used to indicate the relative positional relationship. When the absolute position of the object being described is changed the relative positional relationship may also change accordingly.

It will be understood that when an element such as a layer, a film, a region or a substrate is referred to as being "on" or "under" another element, the element may be "directly" "on" or "under" another element, or an intermediate element may be present.

A numerical range modified by "about" herein means that the upper and lower limits of the numerical range can vary by 10% thereof. A numerical value modified by "about" herein means that the numerical value can vary by 10% thereof In the description of the following embodiments, specific features, structures, materials or characteristics may be combined in any suitable manner in any one or more embodiments or examples.

In the current Fringe Field Switching (FFS) display panel, the pixel structure in the array substrate adopts a single-gate structure or a dual-gate structure. The dual-gate pixel structure can effectively reduce the number of data lines, which in turn reduces the number of data line integrated circuit (IC) connectors, thereby achieving cost reduction.

FIG. 1a shows a dual-gate pixel structure in the related art. As shown in FIG. 1, the dual-gate pixel structure includes a plurality of sub-pixels arranged in an array, a plurality of gate lines 4, and a plurality of data lines 5. The plurality of gate lines 4 extends in a row direction of the array of the plurality of sub-pixels (hereinafter referred to as a row direction), and the plurality of the data lines 5 extends in a column direction of the array of the plurality of sub-pixels (hereinafter referred to as a column direction). Each row of sub-pixels corresponds to two gate lines 4, and the two gate lines 4 are respectively disposed on two sides of the corresponding row of sub-pixels. The plurality of sub-pixels included in each row is alternately electrically connected to the corresponding two gate lines 4. That is, each row of sub-pixels is configured to be controlled by the gate voltage signals provided by the two gate lines 4. A data line 5 is disposed between every two columns of sub-pixels, and the two columns of sub-pixels are electrically connected to the data line 5 disposed between the two columns of sub-pixels. That is, one data line 5 is configured to provide data voltage signals to two columns of sub-pixels located on both sides of the data line 5. In this way, with a dual-gate pixel structure, the number of data lines 5 can be reduced in half relative to, a single-gate pixel structure, thereby reducing the number of data line IC connectors.

It should be noted that the above describes an exemplar dual-gate pixel structure. The actual structure of the dual-gate pixel structure is not limited thereto. In some other embodiments, one data line 5 is disposed on one side (left side or right side) of each two columns of sub-pixels, and the two columns of sub-pixels are electrically connected to the data line 5 disposed on one side of the two columns of sub-pixels. That is, one data line 5 is configured to provide data voltage signals to two columns of sub-pixels located on the same side (left or right side) of the data line 5. Of course, the dual-gate sub-pixels can also have other structures, which are not enumerated here.

Figure 1B:
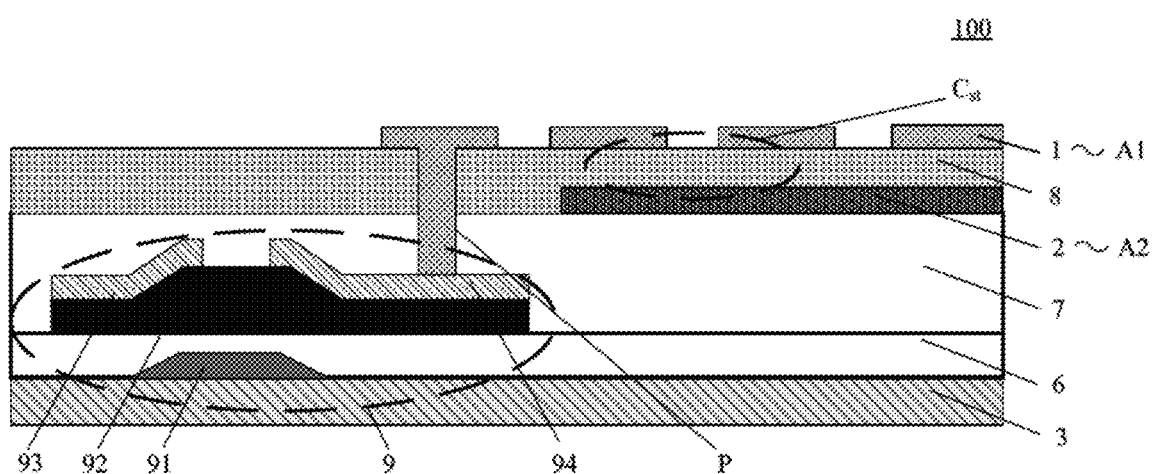
FIG. 1b is a cross-sectional view of FIG. 1a taken along section line SS'.
Figure 1C:
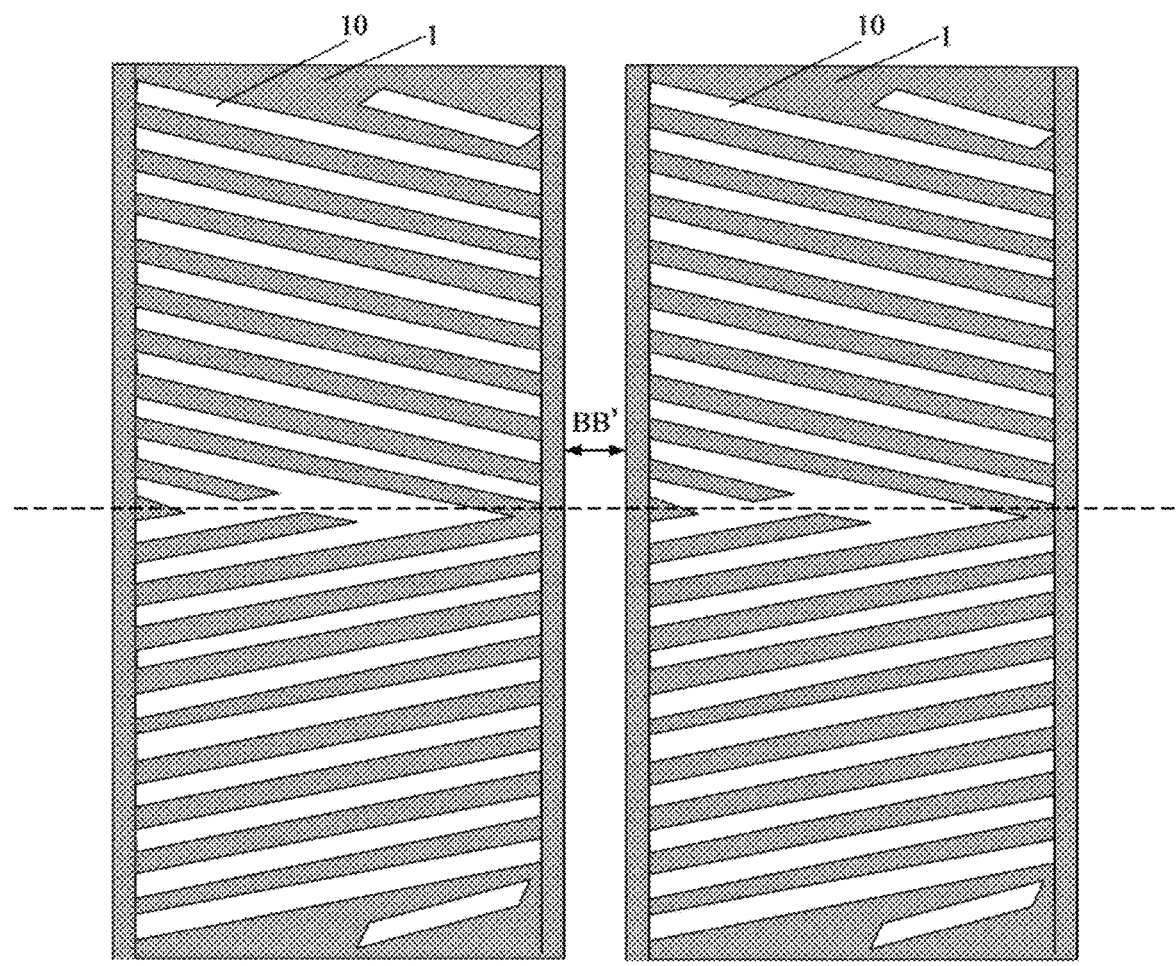

FIG. 1b shows a cross-sectional structure of the allay substrate 100 of the above dual-gate pixel structure. As shown in FIG. 1b, the array substrate 100 includes a base substrate 3, a thin film transistor array, a gate insulating layer 6, a passivation layer 7, a second electrode layer A2, an insulating layer 8, and a first electrode layer A1 sequentially disposed on the base substrate 3. The thin film transistor array includes a plurality of thin film transistors 9 in one-to-one correspondence with a plurality of sub-pixels. Each of the thin film transistors 9 includes a gate electrode 91, an active layer 92, a source electrode 93, and a drain electrode 94. The second electrode layer A2 may be a whole layer of conductive film. In one embodiment, the second electrode 2 is a common electrode. The first electrode layer A1 includes a plurality of first electrodes 1, which is in one to one correspondence with the plurality of sub-pixels. As shown in FIG. 1c, each of the first electrodes 1 is fanned with a plurality of slits 10, and the first electrode 1 is a closed structure at the periphery. Illustratively, the first electrode 1 is a pixel electrode. When a pixel voltage signal is transmitted to the first electrode 1 and a common voltage signal is transmitted to the second electrode 2, since the first electrode 1 has the slits 10, an electric field can be formed between the first electrode 1 and the second electrode 2. The formed electric field controls deflection of the liquid crystal molecules to achieve the display.

The structural design of the first electrode 1 as shown in FIG. 1c, have the following problems:

(1) During the display process, the region corresponding to the slit 10 in the first electrode 1 can generate a horizontal electric field, and the liquid crystal molecules can be normally deflected under the action of the horizontal electric field to realize image display. Such electric field is called an effective electric field, which is the electric field required fix normal display.

However, at the periphery of the first electrode 1, that is, at the sealing positions at both ends of the slit 10, an electric field is generated due to the presence of the first electrode conductive film. This electric field can cause some liquid crystal molecules to gather near these positions. The distribution and direction of this electric field are different from those of the horizontal electric field at the intermediate portion (ie, the slit region) of the first electrode 1. This electric field cannot drive the liquid crystal molecules to undergo rotational conversion in a plane parallel to the base substrate 3, that is, it cannot drive the liquid crystal molecules to be normally deflected. Such an electric field is called an ineffective electric field, which is an electric field that is not required for normal display.

Figure 2A:
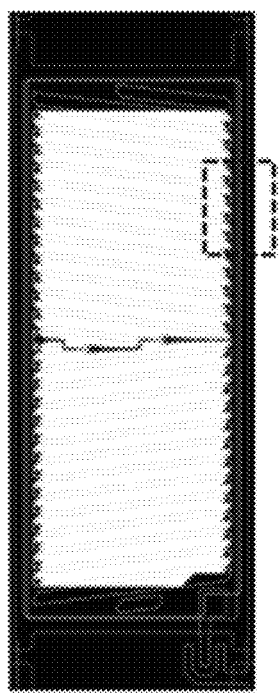
FIG. 2a is a light transmission diagram of the first electrode of FIG. 1a when the gray level is L255.
Figure 2B:
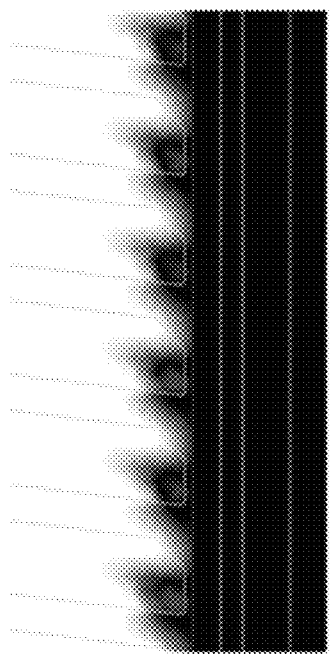
FIG. 2b is a partial enlarged view of FIG. 2a enclosed in the dashed box.

As shown in FIGS. 2a and 2b, the ineffective electric field generated at the periphery of the first electrode 1 can cause dark spots in the corresponding areas. Even when the picture is L255 gray scale, these areas are still dark, thereby resulting in a decrease in the sub-pixel aperture ratio and a decrease in the transmittance of the display panel. In this case, in order to ensure the brightness required for the display screen, the brightness of the backlight module can only be increased, thereby resulting in an increase in power consumption of the backlight module.

(2) As shown in FIG. 1a, since the periphery of the first electrode 1 is closed, the area of the data line 5 facing the side surface of the first electrode 1 is large. As such, the lateral parasitic capacitance Cpd generated between the data line 5 and the side surface of the first electrode 1 is large. Accordingly, the longitudinal crosstalk caused by the lateral parasitic capacitance Cpd is large, thereby affecting the display quality.

(3) As shown in FIG. 1b, there is a storage capacitor Cst between the first electrode 1 and the second electrode 2. Since the first electrode 1 is a fully enclosed structure, the facing area between the first electrode 1 and the second electrode 2 is large, thereby making storage Capacitor Cst larger. In the process of charging the storage capacitor Cst, under the same charging time, the larger storage capacitor Cst will cause the sub-pixel charging rate to decrease. As such, the problem of insufficient charging is likely to occur.

Figure 3A:
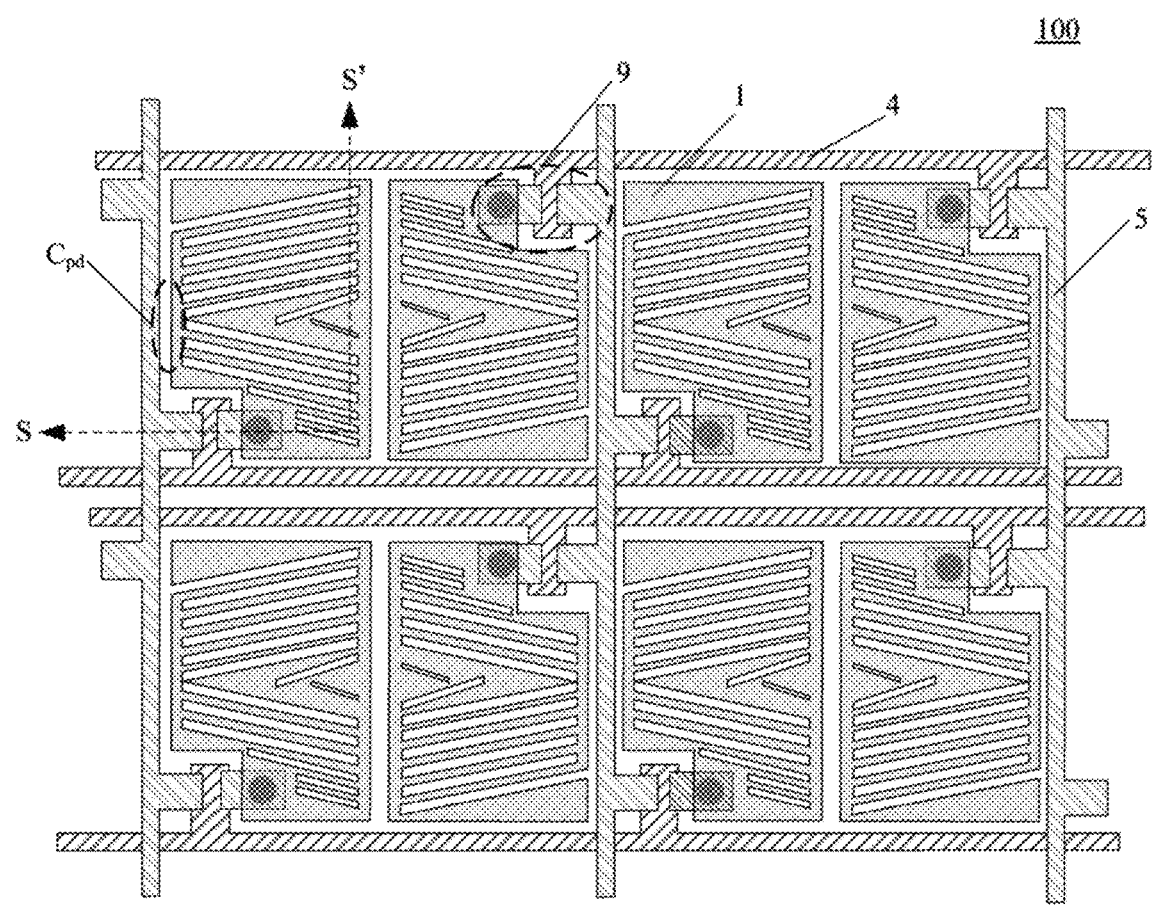
FIG. 3a is a first top view of an array substrate of a dual-gate pixel structure according to one embodiment of the present disclosure.
Figure 3B:
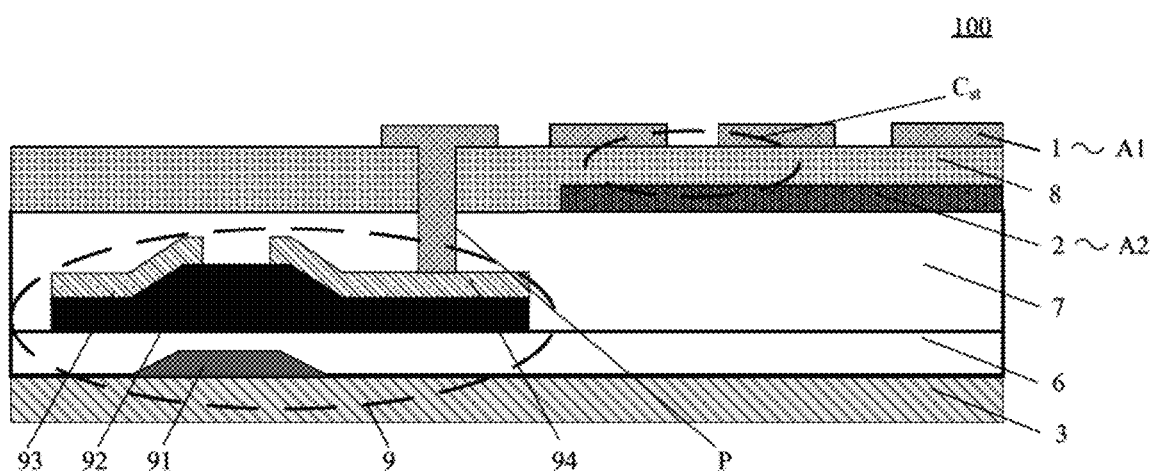
FIG. 3b is a cross-sectional view of FIG. 3a taken along section line SS'.

In order to solve the above problem and improve the transmittance of the display panel, one embodiment of the present disclosure provides an array substrate 100. As shown in FIG. 3a and FIG. 3b, the array substrate 100 includes a plurality of sub-pixels arranged in an array and a plurality of gate lines 4. The plurality of sub-pixels of each row alternately electrically connects to the two gate lines 4. The pixel structure of the array substrate 1(X) is a dual-gate pixel structure. The array substrate 100 includes a base substrate 3 and a first electrode layer A1 disposed on the base substrate 3. The first electrode layer A1 includes a plurality of first electrodes 1 and the plurality of first electrodes 1 is in one to one correspondence with the plurality of sub-pixels.

Figure 3C:
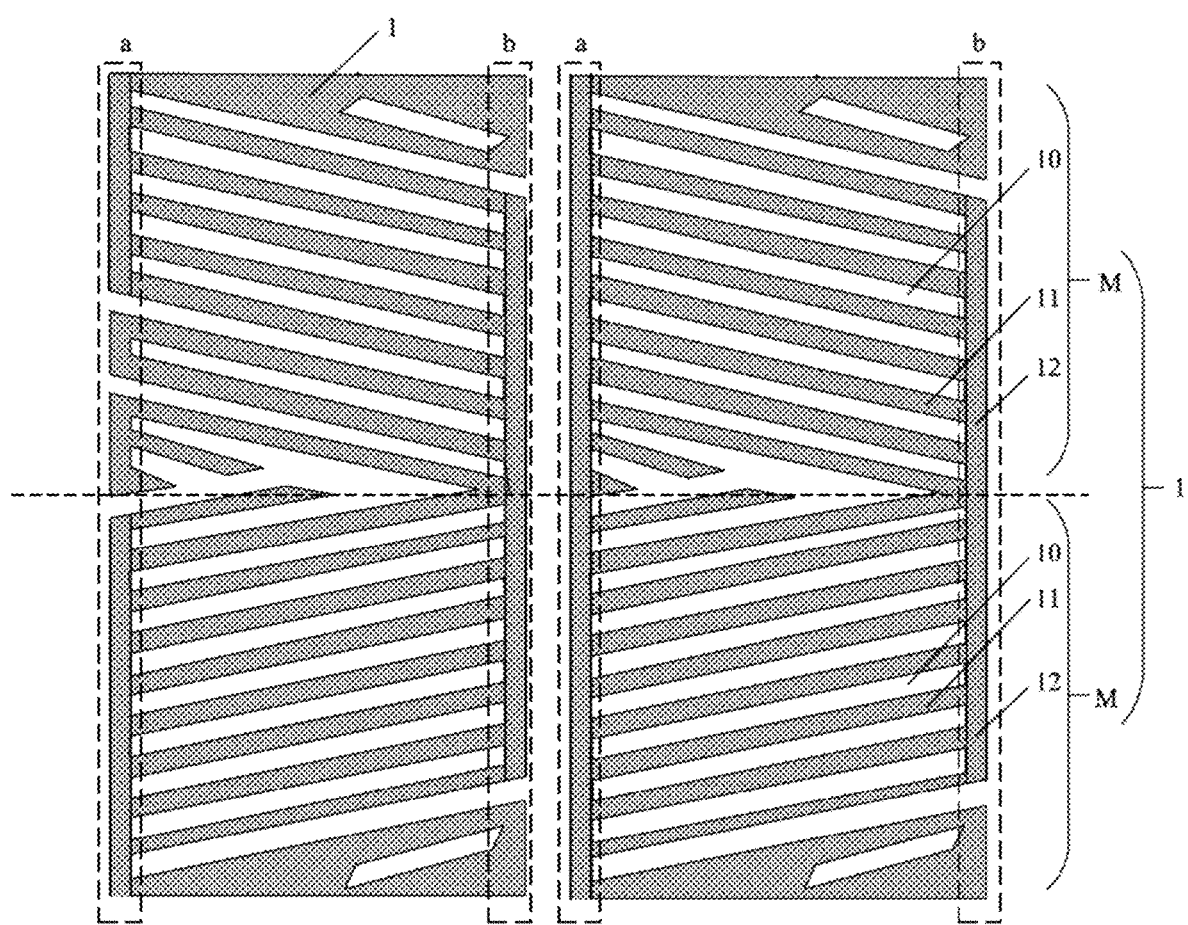
FIG. 3c is a first planar structural view of a first electrode in an array substrate according to one embodiment of the present disclosure.

FIG. 3c shows a structure of the first electrode 1 according to one embodiment of the present disclosure. As shown in FIG. 3c, each of the first electrodes 1 includes at least one first electrode unit M. Each of the first electrode units M includes a plurality of strip electrodes 11 and at least a connection electrode 12 disposed at the periphery of the plurality of strip electrodes 11. The plurality of strip electrodes 11 are electrically connected to the connection electrode 12. The plurality of strip electrodes 11 are spaced apart to form a plurality of slits 10. The connection electrode 12 disconnects at at least one position such that one end of at least one slit 10 forms an opening at the disconnected position of the connection electrode 12.

It should be noted that, as a possible design, when the sub-pixel is a single domain structure, the corresponding first electrode 1 includes one first electrode unit M. When the sub-pixel is a multi-domain structure, the corresponding first electrode includes a plurality of first electrode units M, and each of the first electrode units M corresponds to one domain. Exemplarily, as shown in FIG. 3c, the sub-pixels have a dual domain structure, and the corresponding first electrodes 1 include two first electrode units M corresponding to two domains, respectively. Hereinafter, the description will be made by taking each of the first electrodes 1 including two first electrode units M as an example.

As shown in FIG. 3a, in some embodiments, the extending direction of the plurality of strip electrodes 11 of the first electrode 1 may be parallel to the gate lines 4, or an angle formed between the extending direction of the plurality of strip electrodes 11 of the first electrode 1 and the direction parallel to the gate line 4 is less than 45° (in this case, it is considered that the extending direction of the strip electrode 11 is substantially parallel to the gate line 4). Furthermore, the extending direction of the plurality of slits 10 formed by the plurality of strip electrodes 11 coincides with the extending direction of the plurality of strip electrodes 11.

Hereinafter, the two ends of each of the slits 10 in the extending direction thereof are respectively referred as a-end and b-end, and the ends of each of the strip-shaped electrodes 11 in the extending direction thereof are also referred as a-end and b-end, respectively. The two sides of the first electrode 1 where each strip electrode 11 and each slit 10 are located are respectively referred as a-side and b-side of the first electrode 1.

In some embodiments, the extending direction of the plurality of strip electrodes 11 of the first electrode 1 may be parallel to the data line 5, or the angle formed by the extending direction of the plurality of strip electrodes 11 of the first electrode 1 and the direction parallel to the data line 5 is less than 45° (in this case, the extending direction of the strip electrode 11 is considered to be substantially parallel to the data line 5). Furthermore, the extending direction of the plurality of slits 10 formed by the plurality of strip electrodes 11 coincides with the extending direction of the plurality of strip electrodes 11.

Of course, in a plane parallel to the base substrate 3, the extending direction of the plurality of strip electrodes 11 of the first electrode 1 may be in any one direction, which is not limited by the embodiment of the present disclosure.

It should be noted that in order to facilitate the uniform transmission of a voltage signal (for example, a pixel voltage signal or a common voltage signal) to all the strip electrodes 11 of the first electrode 1, the plurality of strip electrodes 11 in the first electrode 1 are electrically connected to one another to form a path. The path connecting the plurality of strip electrodes 11 in the first electrode 1 is prevented from being open at one or more positions. Thus, when a voltage signal is transmitted to the first electrode 1, the voltage signal needs to be applied to only a certain position of the first electrode 1, so that the voltage signal is transmitted, to all the strip electrodes 11. In some embodiments, the plurality of strip electrodes 11 of the first electrode 1 may be connected to the connection electrode 12 such that the plurality of strip electrodes 11 of the first electrode 1 are electrically connected to one another through the connection electrode 12. The connection electrode 12 disconnects at at least one position, and the disconnection does not break the path connecting the plurality of strip electrodes 11 in the first electrode 1. Therefore, the strip electrode 11 corresponding to the disconnection of the connection electrode 12 is electrically connected at the other end away from the break. In other words, for a slit 10, the ends of the slit 10 cannot be both opened, and at least one end should be closed.

In the array substrate 100 provided in this embodiment, since the plurality of strip electrodes 11 are spaced apart from each other to form a plurality of slits 10 in the first electrode 1. The connection electrodes 12 is disconnected at at least one position such that one end of at least one slit 10 forms an opening at the disconnected position of the connection electrode 12. That is, the first electrode 1 is not a fully enclosed structure, so that an effective electric field can be formed at one end where the slit 10 forms an opening. As such, liquid crystal molecules at the one end of the slit 10 having the opening can be normally deflected by the effective electric field there. The problem that a dark area occurs at a closed position due to the inability of the end portion of the slit 10 to form an effective electric field is solved. That is, the dark area at the periphery of the first electrode 1 is reduced, thereby increasing the amount of light transmitted at the periphery of the first electrode 1. Thus, the aperture ratio of the sub-pixel is increased, thereby improving the transmittance of the display panel.

Further, since the transmittance of the display panel is improved, the power consumption of the backlight module of the liquid crystal display apparatus can be reduced.

Furthermore, the extending direction of the plurality of strip electrodes 11 of the first electrode 1 is parallel to the gate lines 4, or the angle formed by the extending direction of the plurality of strip electrodes 11 of the first electrode 1 and the direction parallel to the gate line 4 is less than 45° (in this case, the extending direction of the strip electrode 11 is considered to be substantially parallel to the gate line 4). Since the plurality of strip electrodes 11 are spaced apart from one another in the first electrode 1, there is an opening at the end of the strip slit 10, the area of the data line 5 of the array substrate 100 facing the first electrode 1 is reduced, so that the lateral parasitic capacitance C between the data line 5 and the side surface of the first electrode 1 is reduced. The problem of poor display such as vertical crosstalk, flicker, etc. caused by the lateral parasitic capacitance between the data line 5 and the side surface of the first electrode 1 can be effectively improved.

In addition, in the first electrode, the end portions of the plurality of slits 10 formed by the plurality of spaced strip electrodes 1.1 have openings. Thus, the facing area between the first electrode 1 and the second electrode 2 is reduced, so that the storage capacitor $C_{st}$ between the first electrode 1 and the second electrode 2 is reduced. Accordingly, the charging time of the sub-pixel can be shortened, thereby avoiding the problem of insufficient charging due to the excessive storage capacitor Cst.

In some embodiments, the width of each of the plurality of slits 10 formed by the plurality of strip electrodes 11 in each first electrode unit M may be set to be greater than or equal to the resolution of the exposure machine selected for preparing the first electrode 1 in order to ensure that the path connecting the plurality of strip electrodes 11 in the first electrode 1 does not break. in one embodiment, the resolution of the selected exposure machine is 2 μm, and the plurality of slits 10 formed by the plurality of strip electrodes 11 of each first electrode unit M have a width of about 2 μm to about 3 μm. Thus, the width of the slit 10 is matched with the resolution of the exposure machine, and the resolution of the exposure machine can fully satisfy the width of the plurality of slits 10, thereby preventing the path connecting the plurality of strip electrodes 11 in the first electrode from being broken. Furthermore, the width of the slit 10 is not too wide, thereby ensuring the effect of an effective electric field.

Figure 4A:
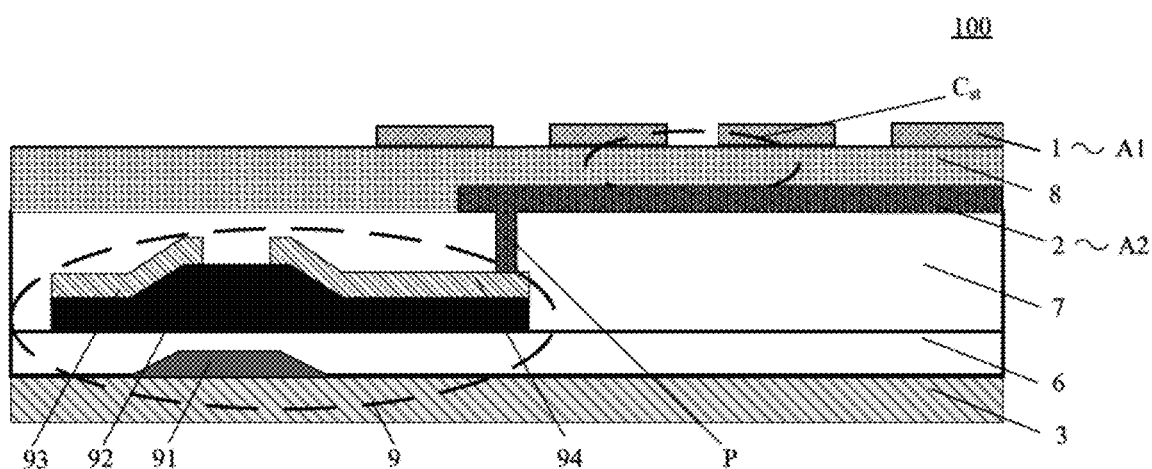
FIG. 4a is a cross-sectional view of an array substrate of a dual-gate pixel structure according to one embodiment of the present disclosure.

In some embodiments, as shown in FIG. 4a, the array substrate 100 further includes a second electrode layer A2 disposed on a side of the first electrode layer A1 facing the base substrate 3. In one embodiment, the first electrode layer A1 is a pixel electrode layer, and the first electrode 1 is configured to transmit a pixel voltage signal. The second electrode layer A2 is a common electrode layer configured to transmit a common voltage signal. The second electrode layer A2 may be an entire layer of a conductive film. In one embodiment, the first electrode layer A1 is a common electrode layer, and the first electrode 1 is configured, to transmit a common voltage signal. The second electrode layer A2 is a pixel electrode layer. The second electrode layer. A2 includes a plurality of second electrodes 2 corresponding to the plurality of sub-pixels, and each of the second electrodes 2 may be a block electrode to respectively transmit a different pixel voltage signal.

In one embodiment, the first electrode layer A1 is a common electrode layer and the second electrode layer A2 is a pixel electrode layer. Furthermore, each at least two adjacent first electrodes are in contact to each other or one another, Optionally, each at least two adjacent first electrodes 1 may comprise at least two consecutive first electrodes 1 in the same row, for example, three consecutive first electrodes 1 in the same row, or four consecutive first electrodes 1 in the same row, or all the first electrodes 1 of an entire row.

Optionally, each at least two adjacent first electrodes 1 may include at least two adjacent first electrodes 1 in one block. Here, the "block" refers to one of a plurality of sub-areas obtained by dividing the entire area in which the first electrode layer A1 is located. Each of the sub-areas includes at least two adjacent first electrodes 1, and the at least two adjacent first electrodes 1 may be a plurality of first electrodes 1 in at least two consecutive rows and at least two consecutive columns. For example, each at least two adjacent first electrodes 1 are 6 first electrodes 1 in three consecutive rows and two consecutive columns, or each at least two adjacent first electrodes 1 are 9 first electrodes in 3 consecutive rows and 3 consecutive columns.

Optionally, each at least two adjacent first electrodes 1 may include all of the first electrodes 1 included in the first electrode layer A1.

In some embodiments, each at least two adjacent first electrodes 1 are connected to one another, that is, there is no gap between the at least two first electrodes 1 that are connected. As such, a blind zone of the effective electric field between the two first electrodes 1 is greatly reduced and the sub-pixel aperture ratio is increased, thereby increasing the transmittance of the display panel.

Figure 4B:
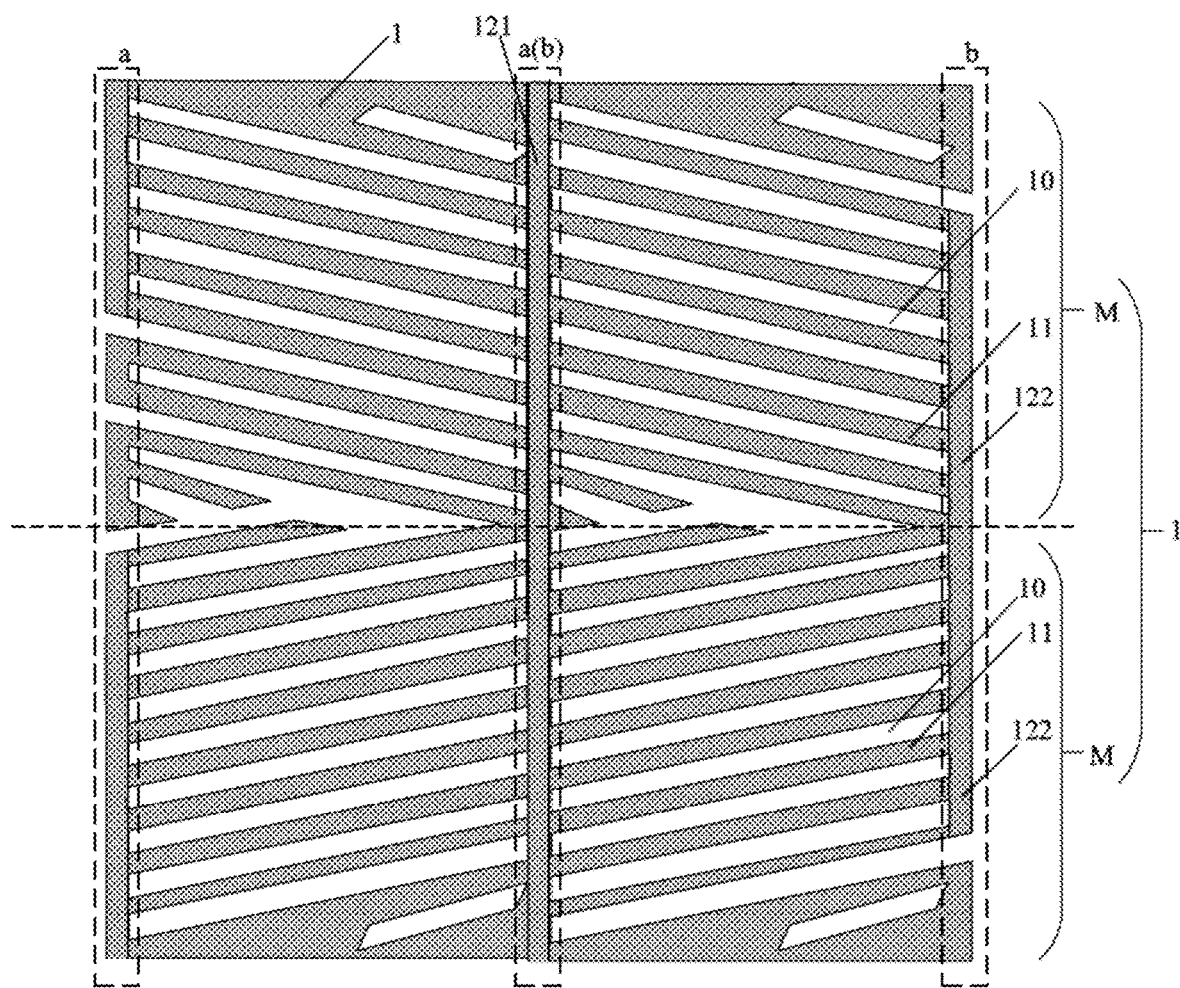
FIG. 4b is a second planar structural view of a first electrode in an array substrate according to one embodiment of the present disclosure.

In some embodiments, as shown in FIG. 4b in the plurality of first electrodes 1 of each row, two first electrode units M at corresponding positions of two adjacent first electrodes 1 respectively are connected. Thus, there is no gap between the two adjacent first electrodes 1.

It should be noted that, for a dual-gate pixel structure in which every two columns of sub-pixels are electrically connected to a data'line disposed between the two columns of sub-pixels. The above-mentioned each two adjacent first electrodes 1" refers to the two first electrodes whose orthographic projection on the base substrate 3 is between orthographic projection of two adjacent data lines 5 on the base substrate 3.

In one embodiment, in each two adjacent first electrodes 1, the upper first electrode unit M of the left first electrode 1 and the upper first electrode unit M of the right first electrode 1 correspond to each other. The "b" side of the upper first electrode unit M of the left first electrode is connected to the "a" side of the upper first electrode unit M of the right first electrode 1. As such, the upper first electrode unit M of the left first electrode 1 and the upper first electrode unit M of the right first electrode 1 are connected.

Similarly the lower first electrode unit M of the left first electrode 1 and the lower first electrode unit M of the right first electrode 1 correspond to each other. The "b" side of the lower first electrode unit M of the left first electrode 1 is connected to the "a" side of the lower first electrode unit M of the right first electrode 1. As such, the lower first electrode unit M of the left first electrode 1 and the lower first electrode unit M of the right first electrode 1 are connected.

As shown in FIGS. 1c and 4c, in the structure of the first electrode 1 shown in FIG. 1c, there is a gap BB' between two adjacent first electrodes 1. In the structure of the first electrode 1 shown in FIG. 4b, the two adjacent first electrodes 1 are connected to each other. That is, in one embodiment of the present disclosure, there is no gap between two adjacent first electrodes 1. As such, a blind area of the effective electric field between the two adjacent first electrodes 1 is greatly reduced. As such, the sub-pixel aperture ratio is increased, thereby further increasing transmittance of the display panel.

In some embodiments, as shown in FIG. 4b, the connection electrodes 12 of the two adjacent first electrode units M each include a first sub-connection electrode 121 disposed between the regions where the plurality of strip electrodes 11 of the two adjacent first electrode units M is located. The ends of the plurality of strip electrodes 11 of the two first electrode units M that are adjacent to each other are connected to the respective first sub-connection electrodes 121. Exemplarily, the b-end of the strip electrode 11 of the left first electrode unit M and the a-end of the strip electrode 11 of the right first electrode unit M are both connected to the respective first sub-connection electrodes 121. The first sub-connection electrodes 121 of the two first electrode units M are connected together, that is, the first sub-connection electrodes 121 of the two adjacent first electrode units M are configured as a same conductive line.

In this way, the two first electrode units M at corresponding positions of the two adjacent first electrodes 1 respectively are connected, so that there is no gap between the two first electrodes 1. As such, the pixel aperture ratio and the transmittance of the display panel are increased. Moreover, since the first sub-connection electrode 121 is connected to the plurality of strip electrodes 11 of the two adjacent first electrode units M, and the first sub-connection electrode 121 is not disconnected, the electrical signals can be respectively transmitted to the plurality of strip electrodes 11 through the first sub-connection electrode 121, thereby reducing the risk of disconnection of the electrodes.

Figure 5:
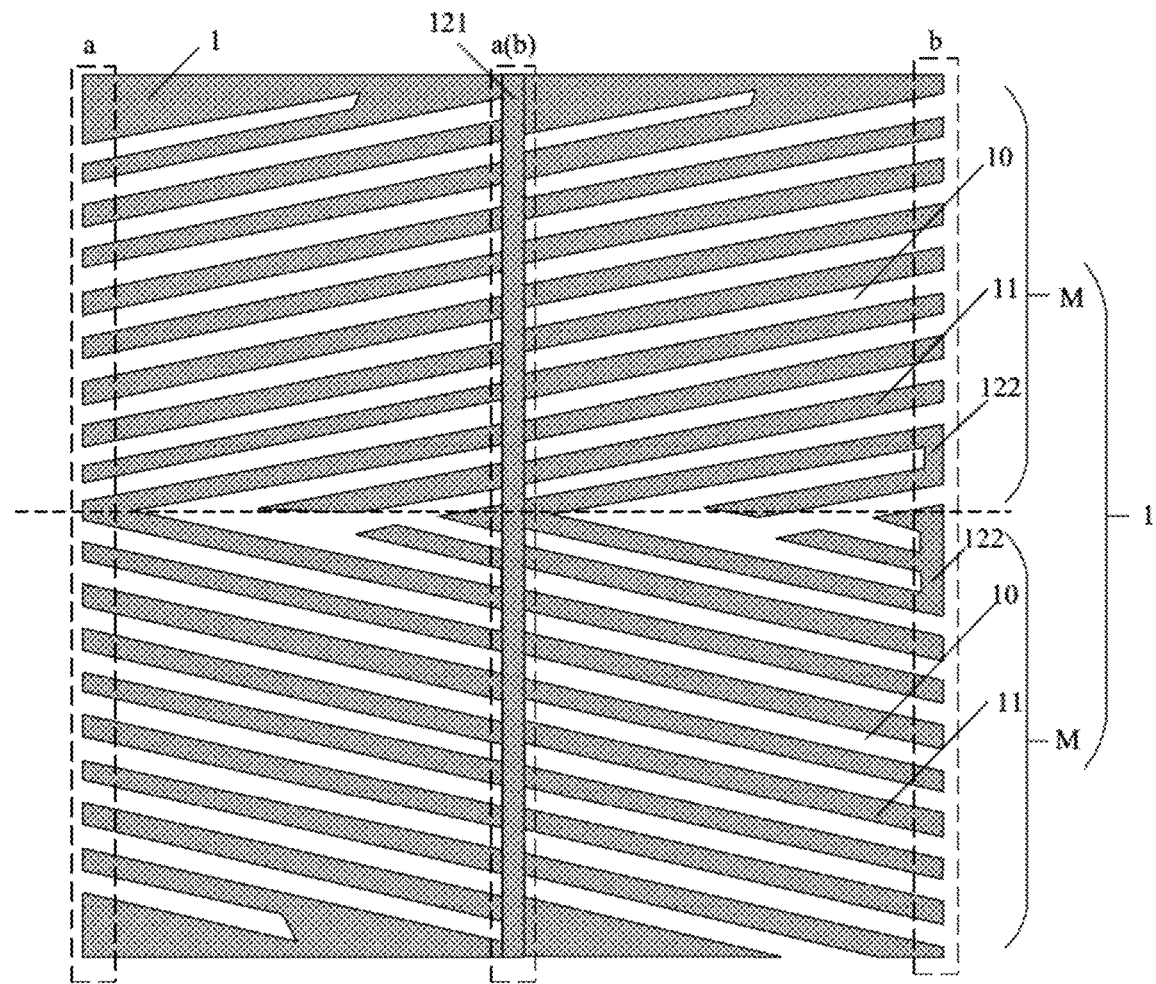
FIG. 5 is a third planar structural view of a first electrode in an array substrate according to an embodiment of the present disclosure.

In some embodiments, as shown in FIG. 5, a connection electrode 12 is not disposed at ends of the plurality of slits 10 of the two connected first electrode units M opposite from the first sub-connection electrode 121. That is, the ends of the plurality of slits 10 of the two connected first electrode units M opposite from the first sub-connection electrode 121 are open, in one example, the a-ends of the plurality of slits 10 of the left first electrode unit M and the b-ends of the plurality of slits 10 of the right first electrode unit. M are both open. Therefore, an effective electric field can be formed at the a-ends of the plurality of slits 10 of the left first electrode unit M and the b-ends of slits 10 of the right first electrode unit M respectively, so that the liquid crystal molecules can be normally deflected. As such, the pixel aperture ratio and the light transmission are increased, thereby increasing transmittance of the display panel. At the same time, the facing area between the first electrode 1 and the second electrode 2 is further reduced, so that the storage capacitor Cst is further reduced, which is advantageous for pixel charging. Furthermore, each strip electrode 11 in each first electrode unit M is connected through the first sub-connection electrode 121, and accordingly open circuit of the electrode is not likely to occur.

In some embodiments, as shown in FIG. 4b, the connection electrode 12 of the first electrode unit M further includes a second sub-connection electrode 122. The second sub-connection electrode 122 and the first sub-connection electrode 121 are respectively disposed on opposite sides of a region where the plurality of strip electrodes 11 of the first electrode unit M are located. The second sub-connection electrode 122 is disconnected at a plurality of positions, and the ends of the plurality of slits 10 formed by the plurality of strip electrodes 11 opposite from the first sub-connection electrode 121 form a plurality of openings at the plurality of disconnected positions of the second sub-connection electrode 122.

In one embodiment, in each two adjacent first electrodes 1, the second sub-connection electrode 122 of the left first electrode unit M is disposed on the a-side of the first electrode unit M, and the second sub-connection electrode 122 of the right first electrode unit M is disposed on the b-side of the first electrode unit M. The plurality of second sub-connection electrodes 122 of the first electrode unit M on the left side are disconnected such that the a-ends of the plurality of slits 10 of the left first electrode unit M form a plurality of openings at the plurality of disconnected positions of the second sub-connection electrode 122. The plurality of second sub-connection electrodes 122 of the right first electrode unit M are disconnected such that the b-ends of the plurality of slits 10 of the right first electrode unit M form a plurality of openings at a plurality of disconnected positions of the second sub-connection electrode 122.

Thus, one end of the slit 10 forms an opening, which not only improves the transmittance of the display panel, but also reduces the storage capacitance Cst. By providing the second sub-connection electrode 122, the plurality of strip electrodes 11 in the first electrode 1 can be electrically connected through the first sub-connection electrode 121 and the second sub-connection electrode 122 at the same time, which is beneficial to the transmission of electrical signals, and further reduces the risk of open circuit of the electrodes.

Figure 6:
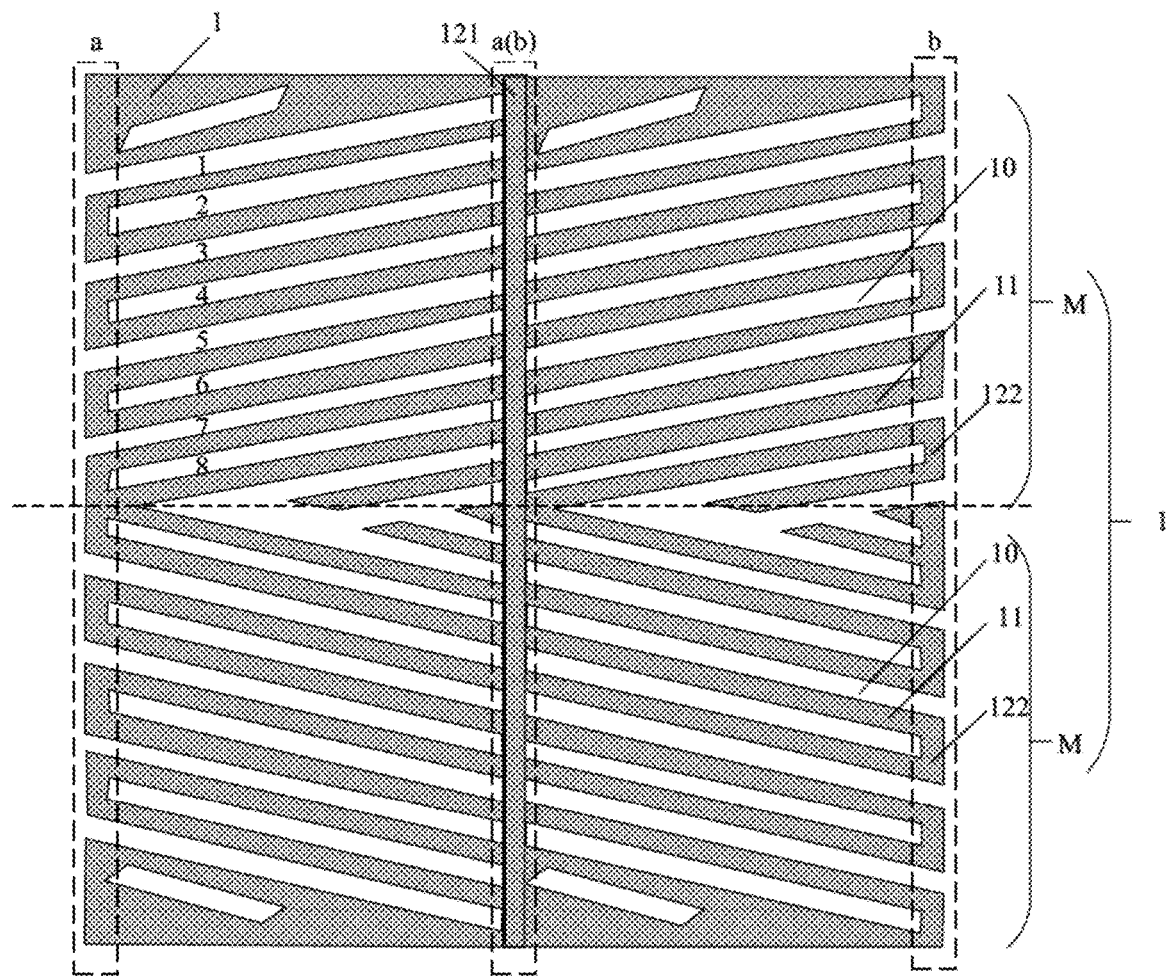
FIG. 6 is a fourth planar structural view of a first electrode in an array substrate according to one embodiment of the present disclosure.

In one embodiment, the ends of the plurality of slits 10 of each of the first electrode units M opposite from the first sub-connection electrode 121 are alternately opened and closed. As shown in FIG. 6, taking the left first electrode unit M as an example, the slits 10 numbered 1, 3, 5, and 7 form an opening at the -end, and the slits 10 numbered 2, 4, and 6 are closed at the a-end. It has been verified that this electrode structure design can increase the transmittance of the display panel by about 3.7% and decrease the storage capacitor Cst by about 3.0% compared to the fully enclosed first electrode structure, as shown in FIG. 1c.

Figure 11A:
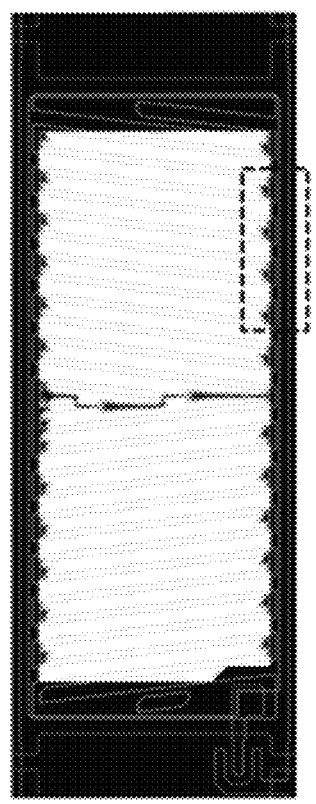
FIG. 11a is a light transmission diagram of a first electrode in an array substrate when the gray level is L255 according to one embodiment of the present it disclosure.
Figure 11B:
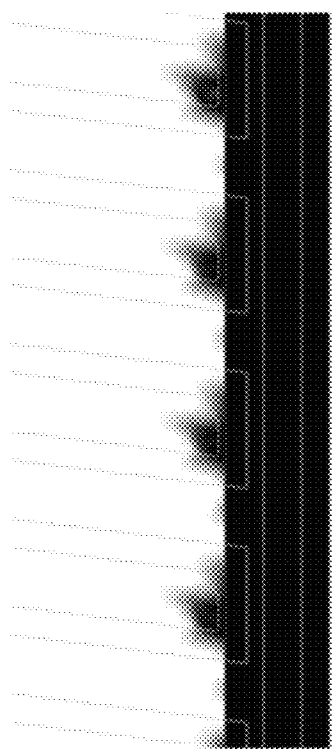
FIG. 11b is a partial enlarged view of FIG. 11a enclosed in the dashed box.

FIG. 11a and FIG. 11b show the light transmission pattern of the first electrode 1 shown in FIG. 6 when the gray scale is L255. Compared with FIGS. 2a and 2b, the light transmission pattern of the first electrode 1 with closed periphery when the gray scale is L255, an effective electric field can be generated on both sides of the first electrode 1, that is, at both ends of the plurality of slits 10, so that the dark region in the corresponding region is greatly reduced. Furthermore, the sub-pixel aperture ratio is increased, and the transmittance of the display panel is also improved. In this case, the power consumption of the backlight module is also reduced accordingly.

Figure 7:
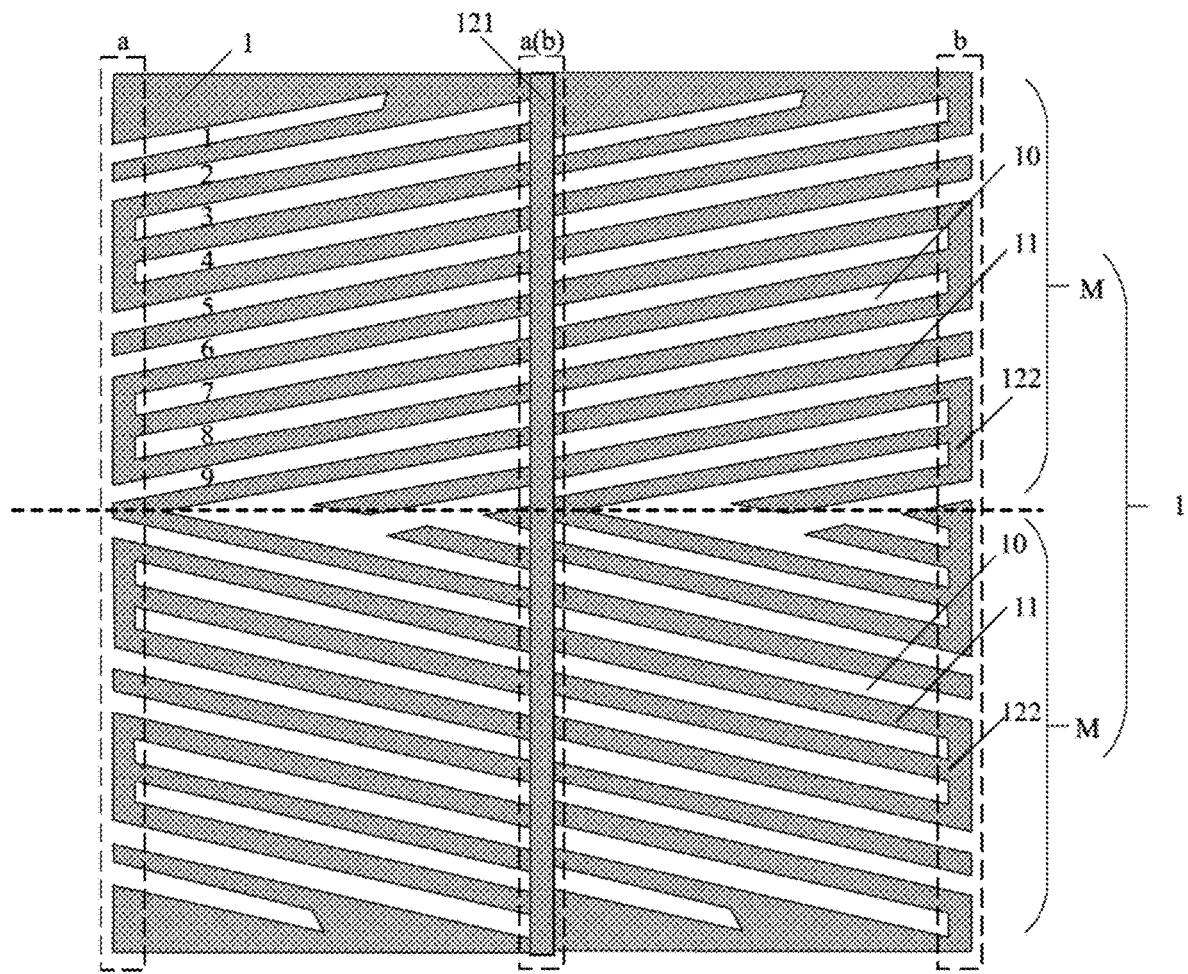
FIG. 7 is a fifth planar structural view of a first electrode in an array substrate according to one embodiment of the present disclosure.

In one embodiment, the plurality of slits 10 of each of the first electrode units M is divided into at least two groups. Each group includes at least two adjacent slits 10, and the ends of the slits 10 of the respective groups of slits 10 opposite from the first sub-connection electrode 121 are alternately opened and closed. As shown in FIG. 7, taking the first electrode unit M on the left side as an example, the plurality of slits 10 are divided into four groups, and each group includes two adjacent slits 10. The slits 10 of Nos. 1 and 2 are the first group, and so on, the slits 10 of Nos. 7 and 8 are the fourth group. Then, the first group and the third group of slits 10, that is, the slits 10 numbered 1, 2, 5, and 6 form openings at the a-ends. The second and fourth groups of slits 10, i.e., slits 10 numbered 3, 4, 7, and 8 are closed at the a-ends.

In some embodiments, the array substrate 100 higher includes a black matrix disposed on a side of the first electrode layer A1 facing or opposite from the base substrate 3. The orthographic projection of the first sub-connection electrode 121 on the base substrate 3 is within the orthographic projection of the black matrix on the base substrate 3. The black matrix is used to block the gap between two adjacent sub-pixels to prevent sub-pixel leakage of light. Since the two first electrodes 1 of the two adjacent sub-pixel regions are connected by the first sub-connection electrode 121, there is no gap between the two adjacent first electrodes 1. Thus, the black matrix need only block the first sub-connection electrode 121. Because the first sub-connection electrode 121 only performs the function of electrical signal transmission, the width of the first sub-connection electrode 121 can be set to be narrow, and the width of the first sub-connection electrode 121 can be smaller than the width of the gap between the two adjacent first electrodes 1 when there is a gap. Therefore, the width of the black matrix used to block the first sub-connection electrode 121 can be reduced, that is, the width of the black matrix can also be set to be narrow, thereby increasing the aperture ratio of the sub-pixel and improving the transmittance of the display panel.

In one embodiment, the width of the first sub-connection electrode 121 is about 2 µm to about 3 µm, and the width of the black matrix corresponding to the first sub-connection electrode 121 may be greater than or equal to about 7 µm. The width of the black matrix that is conventionally used to block the gap between adjacent sub-pixels is greater than or equal to about 10 µm. In the embodiment of the present disclosure, the width of the black matrix corresponding to the first sub-connection electrode 121 can be reduced to about 7 µm.

Figure 8:
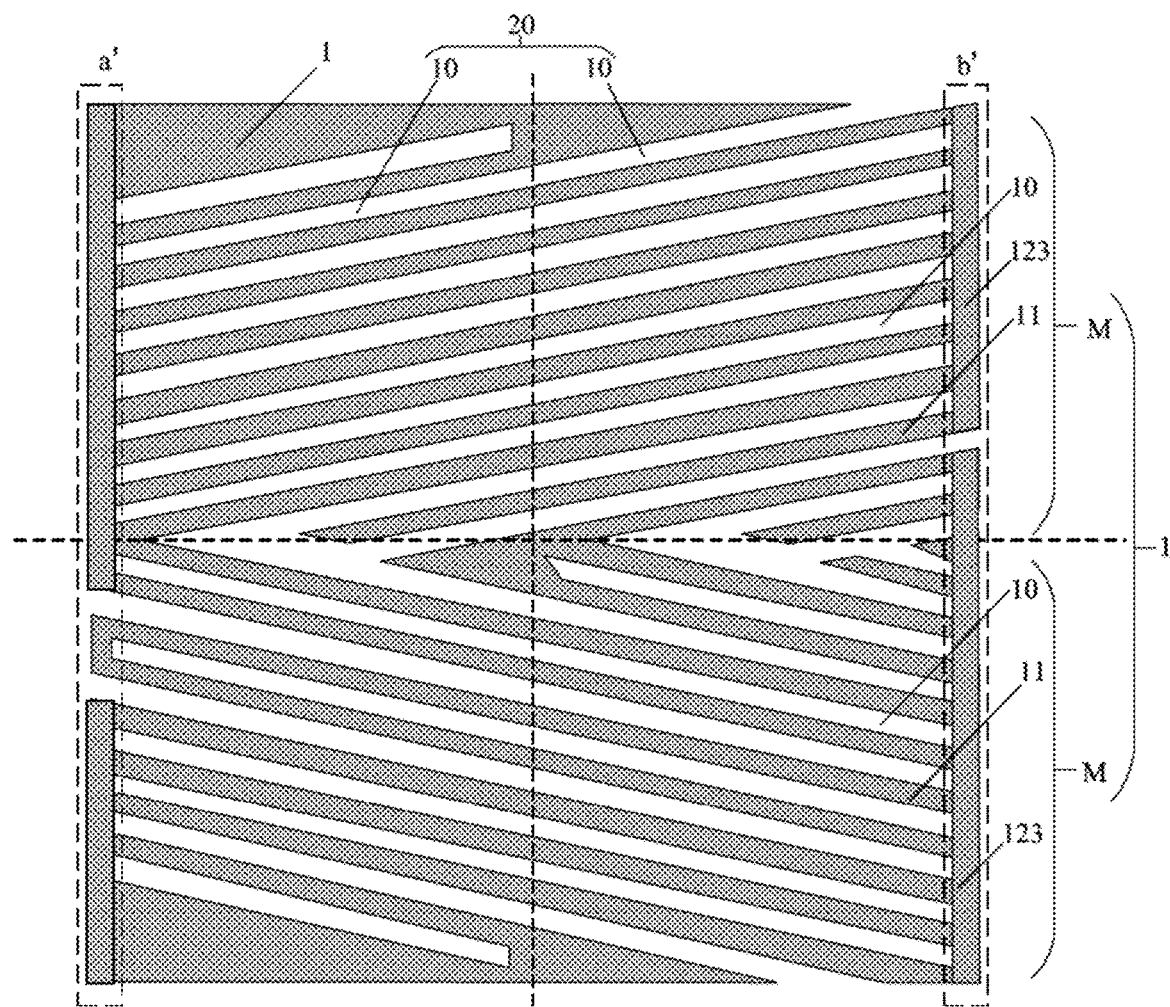
FIG. 8 is a sixth planar structure view of a first electrode in an array substrate according to one embodiment of the present disclosure.

In some embodiments, based on the design of the two first electrode units M being connected, the first sub-connection electrodes 121 between the two adjacent first electrode units M can be removed. That is, the plurality of strip electrodes 11 of the two first electrode units M are in direct contact with each other. As shown in FIG. 8, the plurality of strip electrodes 11 of the two adjacent first electrode units M is connected in one-to-one correspondence. The plurality of slits 10 formed by the plurality of strip electrodes 11 of the two first electrode units M are connected in one-to-one correspondence.

In one embodiment, in each two adjacent first electrodes 1, the upper first electrode unit M of the left first electrode 1 and the upper first electrode unit M of the right first electrode 1 correspond to each other. The b-ends of the plurality of strip electrodes 11 of the upper first electrode unit M of the left first electrode 1 is connected to the a-ends of the plurality of strip electrodes 11 of the upper first electrode unit M of the right first electrode 1 in one to one correspondence. As such, the plurality of strip electrodes 11 of the upper first electrode unit M of the left first electrode 1 and the plurality of strip electrodes 11 of the upper first electrode unit 4 of the right first electrode 1 are connected in one to one correspondence.

Similarly, the lower first electrode unit M of the left first electrode 1 and the lower first electrode unit M of the right first electrode 1 correspond to each other. The b-ends of the plurality of strip, electrodes 11 of the lower first electrode unit M of the left first electrode 1 is connected to the a-ends of the plurality of strip electrodes 11 of the lower first electrode unit M of the right first electrode 1 in one to one correspondence. As such, the plurality of strip electrodes 1.1 of the lower first electrode unit M of the left first electrode 1 and the plurality of strip electrodes 11 of the lower first electrode unit M of the right first electrode 1 are connected in one to one correspondence.

With the design as described above, there is no gap between each two adjacent first electrodes 1, thereby improving the aperture ratio of the sub-pixels and transmittance of the display panel. Moreover, this design does not use the first sub-connection electrode 121 to connect the two first electrodes 1, but to connect the plurality of strip electrodes 11 of the two first electrodes 1 respectively in one to one correspondence. There is no gap between the regions where the plurality of strip electrodes 11 of the two first electrodes 1 is located respectively.

At the connection of the two first electrode units M at corresponding positions of every adjacent two first electrodes 1, that is, at the a-ends of the plurality of slits 10 of the left first electrode unit M and the h-ends of the plurality of slits 10 of the right first electrode unit M, an effective electric field, can be formed and the liquid crystal molecules can be normally deflected, thereby further improving the aperture ratio of the sub-pixel and the transmittance of the display panel.

In some embodiments, as shown in Fi& 8, the plurality of slits 10 formed by the plurality of strip electrodes 11 of the two respective connected first electrode units M are connected in a one-to-one correspondence to form a plurality of connecting slits 20. In the two connected first electrode units M, the connection electrode 12 of each first electrode unit M includes a third sub-connection electrode 123. The third sub-connection electrode 123 is disposed on a side of the region where the plurality of strip electrodes 11 of the first electrode unit M is located opposite from the other first electrode unit M. The third sub-connection electrode 123 of at least one first electrode unit M disconnects at a plurality of positions, and respective ends of the plurality of connecting slits 20 form a plurality of openings at the disconnected positions of the third sub-connection electrode 123.

In one embodiment in each two adjacent first electrodes 1, for the upper and lower first electrode units of the left first electrode 1, the third sub-connection electrode 123 is disposed on the a-side of the first electrode units M. For the upper and lower first electrode units of the right first electrode 1, the third sub-connection electrode 123 is disposed on the b-side of the first electrode units M. The two ends of the connecting slit 20 are referred to as a'-end and b'-end, respectively. The two sides of the combined area formed by the first electrode unit Ms of the two first electrodes 1 are referred as the a'-side and the b'-side, respectively. A third sub-connection electrode 123 of at least one first electrode unit M disconnects at a plurality of positions, and the a'-end and the b'-end of the plurality of connecting slits 20 form a plurality of openings at the disconnected positions of the third sub-connection electrode 123. Furthermore, at least one end of each of the connecting slits 20 is closed.

In the embodiment, the first electrode units M of the two first electrodes 1 are combined into one connecting region. The electrical connection among the plurality of strip electrodes 11 is realized by the thud sub-connection electrode 123, and the path connecting the plurality of strip electrodes 11 of the adjacent two first electrodes 1 to one another is formed. As such, the electrical signals can be transmitted. Furthermore, the third sub-connection electrode 123 is disconnected at a plurality of positions such that the a'-ends and the b'-ends of the connecting slits 20 are open-ended. An effective electric field is formed respectively on both sides of the combined region formed by the first electrode units M of the first electrodes 1. As such, the liquid crystal molecules can be normally deflected, thereby increasing the aperture ratio and light transmission of the sub-pixels. Accordingly the transmittance of the display panel is increased.

At the same time, the a' side and the b' side of the region where the first electrode units M of the two first electrodes 1 are combined have the opening design of the connecting slits 20. As such, the facing area between the first electrode 1 and the second electrode 2 is greatly reduced. Accordingly, the storage capacitor Cst is lowered, which is advantageous for pixel charging.

Figure 9:
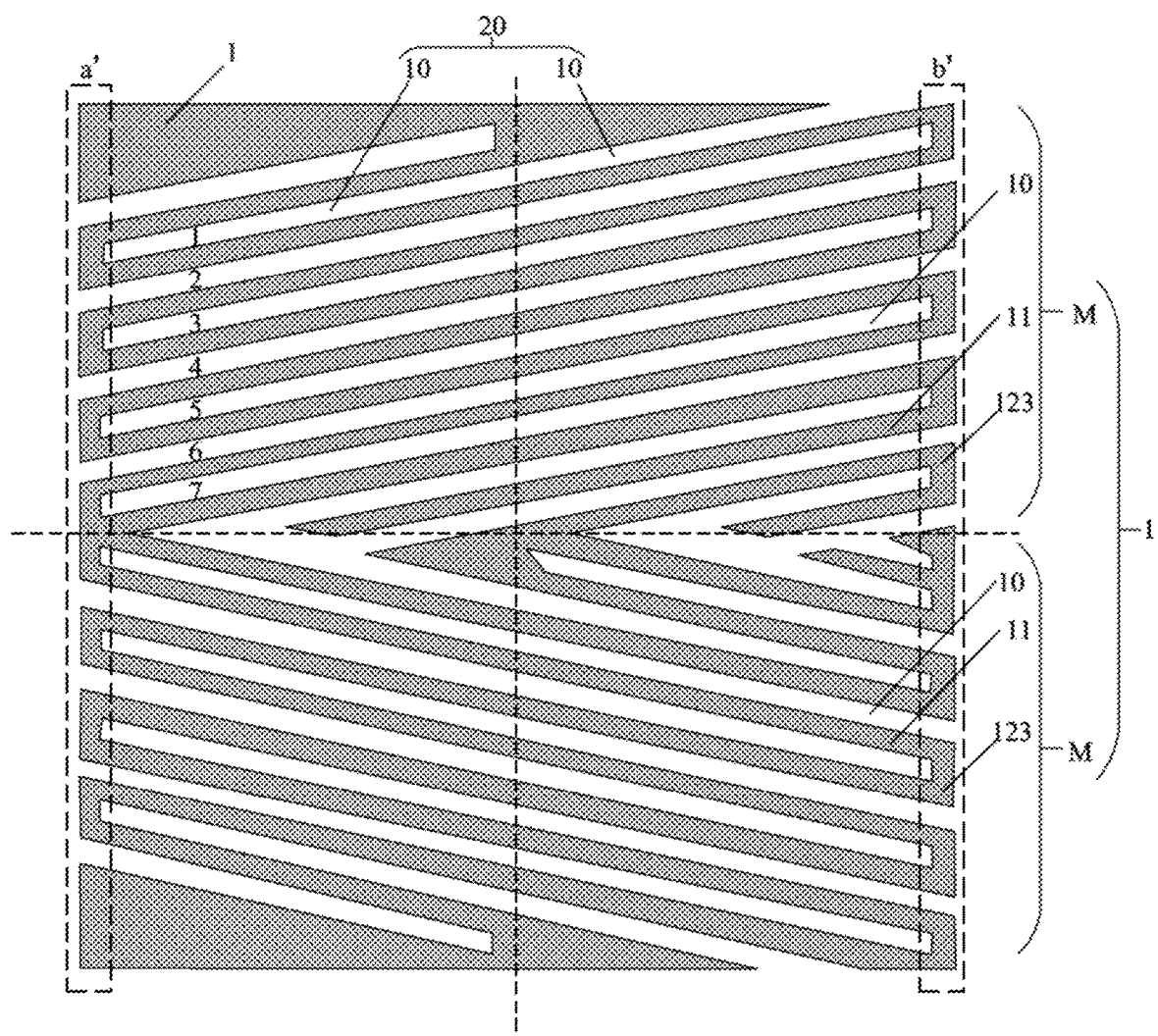
FIG. 9 is a seventh planar structure view of a first electrode in an array substrate according to one embodiment of the present disclosure.

In one embodiment, as shown in FIG. 9, among the two first electrode units M that are connected to each other, the third sub-connection electrode 123 of each of the first electrode units M is disconnected at a plurality of positions, and one end of the plurality of connecting slits 20 is open, and the other end is closed. The ends of the plurality of connecting slits 20 on the same side of the first electrode unit M are alternately opened and closed. In one embodiment, a plurality of connecting slits 20 are sequentially numbered, and the connecting slits 20 numbered 1, 3, 5, and 7 are closed at the a'-end, and are opened at the b'-end. The connecting slits 20 numbered 2, 4, and 6 are open at the a'-end and closed at the b'-end.

Figure 10:
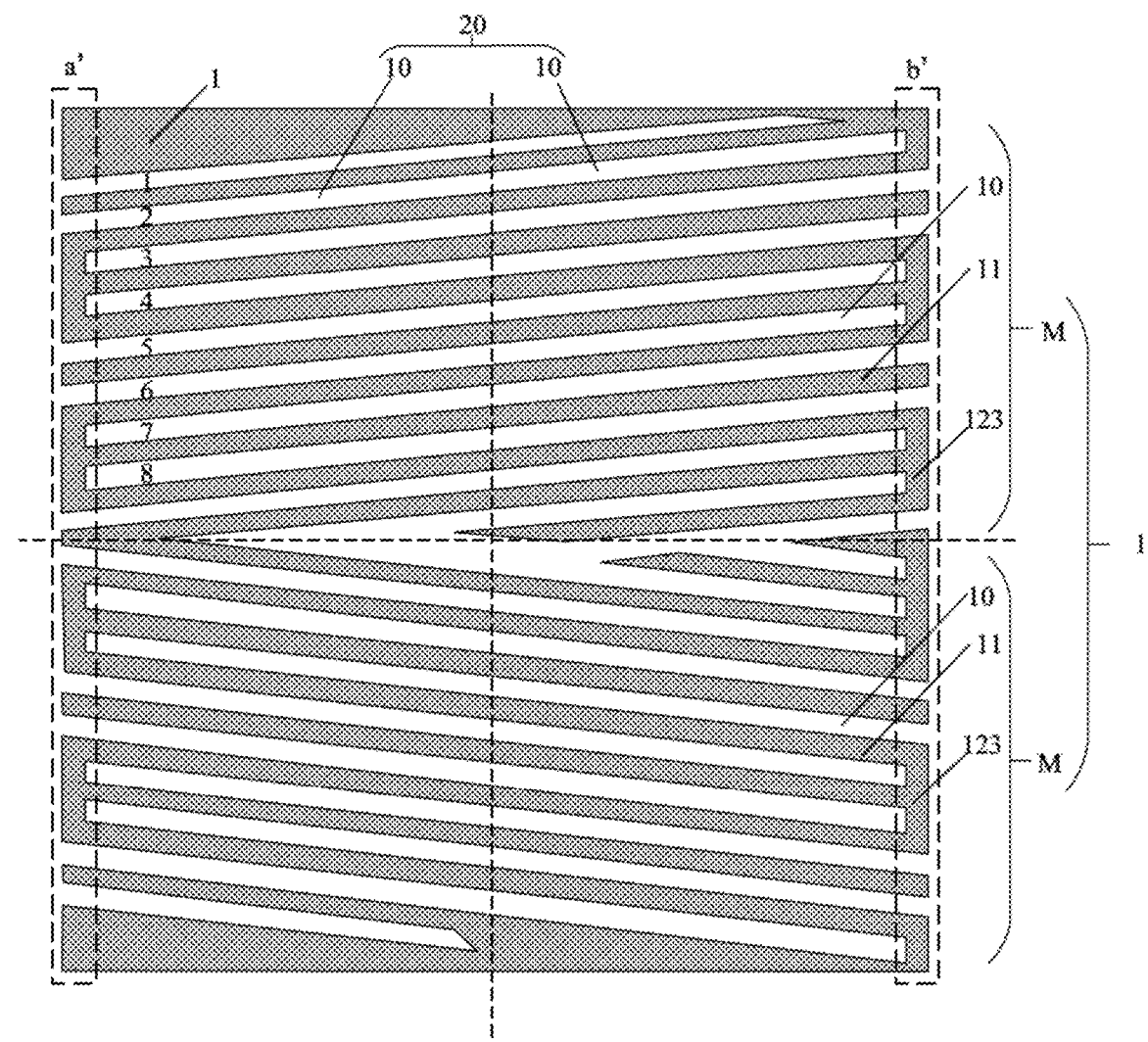
FIG. 10 is an eighth planar structure view of a first electrode in an array substrate according to one embodiment of the present disclosure.

In one embodiment, as shown in FIG. 10, the plurality of connecting slits 20 is divided into at least two groups. Each group includes at least two adjacent connecting slits 20, and the ends of the respective groups of the slits 20 on the same side of the first electrode unit M are alternately opened and closed. In one embodiment, the plurality of connecting slits 20 are sequentially numbered, and the plurality of connecting slits 20 is divided into four groups. Each group includes two adjacent connecting slits 20. Then, the first group and the third group of connecting slits 20, that is, the connecting slits 20 numbered 1, 2, 5, and 6 are opened at the end and closed at the b'-end. The second group and the fourth group of the connecting slits 20, that is, the connecting slits 20 numbered 3, 4, 7, and 8 are closed at the a'-end and open at the b'-end.

It should be noted that, referring to FIG. 3b and FIG. 4a again, the array substrate 100 provided in the embodiments of the present disclosure includes the base substrate 3, the gate lines 4, the data lines 5, and the first electrode layer A1 and the second electrode layer A2. The array substrate 100 further comprises a thin film transistor array layer, a gate insulating layer 6, a passivation layer 7, and an insulating layer 8. The thin film transistor array layer includes a plurality of thin film transistors 9 in one-to-one correspondence with a plurality of sub-pixels. Each thin film transistor includes a gate electrode 91, an active layer 92, a source electrode 93 and a drain electrode 94. The gate electrode 91 and the gate lines 4 are in the same film layer, that is, the gate metal layer. The source electrode 93 and the drain electrode 94 are in the same film layer as the data lines 5, that is, the source/drain metal layer. In one embodiment, the thin film transistor 9 is a bottom gate structure. The active layer 92 is located on a side of the gate electrode 91 opposite from the base substrate 3, and the source electrode 93 and the drain electrode 94 are located on the side of the active layer 92 opposite from the base substrate 3. The gate insulating layer 6 is disposed between the gate metal layer and the active layer 92. The passivation layer 7 is disposed on a side of the source/drain metal layer opposite from the base substrate 3. The passivation layer 7 is provided with a via hole P, and the first electrode layer A1 is electrically connected to the drain electrode 94 in the source/drain metal layer through the via hole P.

One embodiment of the present disclosure further provides a display apparatus including the array substrate 100 according to one embodiment of the present disclosure. The beneficial effects of the display apparatus are the same as those of the array substrate 100 provided above, and are not described herein again.

It should be noted that the display apparatus described above may be a type of liquid crystal display apparatus such as FFS, IPS (In-Plane Switching), ADS (Advanced Super Dimension Switch), or the like.

In addition, the display apparatus may be any product or component having a display function such as a liquid crystal panel, an electronic paper, a mobile phone, a tablet computer, a television, a display, a notebook computer, a digital photo frame, a navigator, or the like.

The principles and the embodiments of the present disclosure are set forth in the specification. The description of the embodiments of the present disclosure is only used to help understand the apparatus and method of the present disclosure and the core idea thereof. Meanwhile, for a person of ordinary skill in the art, the disclosure relates to the scope of the disclosure, and the technical scheme is not limited to the specific combination of the technical features, but also covers other technical schemes which are formed by combining the technical features or the equivalent features of the technical features without departing from the inventive concept. For example, a technical scheme may be obtained by replacing the features described above as disclosed in this disclosure (but not limited to) with similar features.

What is claimed is:

1. An array substrate, comprising:
   a plurality of sub-pixels arranged in an array;
   a plurality of gate lines;
   a plurality of data lines;
   a base substrate;
   a first electrode layer on the base substrate, the first electrode layer comprising a plurality of first electrodes, each of the plurality of first electrodes comprising at least one first electrode unit, the first electrode unit comprising a plurality of strip electrodes, a plurality of slits between the plurality of strip electrodes, and at least one connection electrode at a periphery of the first electrode unit,
   wherein the plurality of strip electrodes are electrically connected to the connection electrode, and the connection electrode disconnects at one or more positions such that corresponding ends of one or more of the plurality of slits form openings at the one or more positions of the connection electrode;
   among the plurality of first electrodes of each row, two first electrode units at corresponding positions of two adjacent first electrode units respectively are connected, and there is no gap between the two adjacent first electrode units;
   the two adjacent first electrode units are electrically connected to each other;
   the two first electrode units correspond to two sub-pixels respectively, and the two sub-pixels are controlled by two sub-pixel control units separately;
   the two adjacent first electrode units are disposed between two adjacent gate lines and between two adjacent data lines;
   the connection electrode of each of the two adjacent first electrodes units comprises a first sub-connection electrode between the two adjacent first electrode units, the plurality of strip electrodes in each of the two adjacent first electrode units is connected to the respective first sub-connection electrode, first sub-connection electrodes of the two adjacent first electrode units form a unitary structure;
   the two adjacent first electrode units correspond to two adjacent sub-pixels respectively, and the unitary structure is disposed as a same conductive line between the two adjacent sub-pixels; and
   the array substrate further comprises a black matrix on a side of the first electrode layer facing or opposite from the base substrate, and orthographic projection of the first sub-connection electrode on the base substrate is within orthographic projection of the black matrix on the base substrate.

2. The array substrate of claim 1, wherein the two sub-pixel control units are thin film transistors.

3. The array substrate of claim 1, wherein the first electrode layer is functioned as a common electrode.

4. The array substrate of claim 1, wherein ends of the plurality of slits opposite from the first sub-connection electrode in the two adjacent first electrode units are all open.

5. The array substrate of claim 1, wherein ends of the plurality of slits opposite from the first sub-connection electrode in the two adjacent first electrode units are alternatively open and closed.

6. The array substrate of claim 1, wherein a width of the first sub-connection electrode is in a range of about 2 μm to about 3 μm.

7. The array substrate of claim 1, wherein the connection electrode of the first electrode unit further comprises a second sub-connection electrode, and the second sub-connection electrode and the first sub-connection electrode are respectively disposed at opposite sides of the first electrode unit;
- the second sub-connecting electrode disconnects at one or more positions, and corresponding ends of the plurality of slits opposite from the first sub-connection electrode form a plurality of openings at the one or more positions of the second sub-connecting electrode.

8. The array substrate of claim 1, wherein the plurality of slits are divided into at least two groups, ends of the plurality of slits opposite from the first sub-connection electrode within each of the at least two groups are uniformly open or closed, and the ends of the plurality of slits opposite from the first sub-connection electrode among different groups are alternately open and closed.

9. The array substrate of claim 8, wherein each of the at least two groups includes 2, 3, or 4 adjacent slits.

10. The array substrate of claim 1, wherein the array substrate further comprises a second electrode layer on a side of the first electrode layer facing or opposite from the base substrate, and the second electrode layer is configured to transmit a pixel voltage signal, the second electrode layer comprises a plurality of second electrodes, and the plurality of second electrodes are in one to one correspondence with the plurality of first electrodes.

11. The array substrate of claim 1, wherein each of the plurality of slits has a width in a range of about 2 μm to about 3 μm.

12. The array substrate of claim 1, wherein the plurality of sub-pixels of each row alternately electrically connects to two of the gate lines; and the plurality of first electrodes are in one to one correspondence with the plurality of sub-pixels.

13. The array substrate of claim 12, wherein extending direction of the plurality of the strip electrodes is substantially parallel to the gate lines, and extending direction of the plurality of slits coincides with the extending direction of the plurality of strip electrodes.

14. A display apparatus, comprising the array substrate of claim 1.

* * * * *